Feb. 16, 1943.  A. C. BUSSEY  2,311,207
PEN CONSTRUCTION
Filed April 7, 1941  2 Sheets-Sheet 1
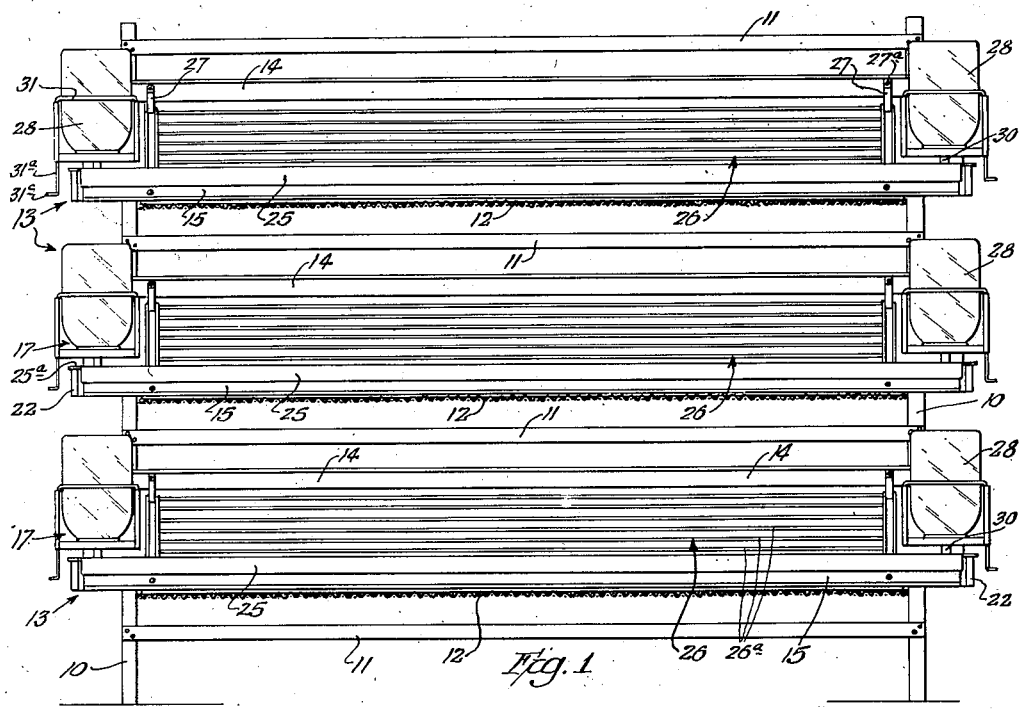
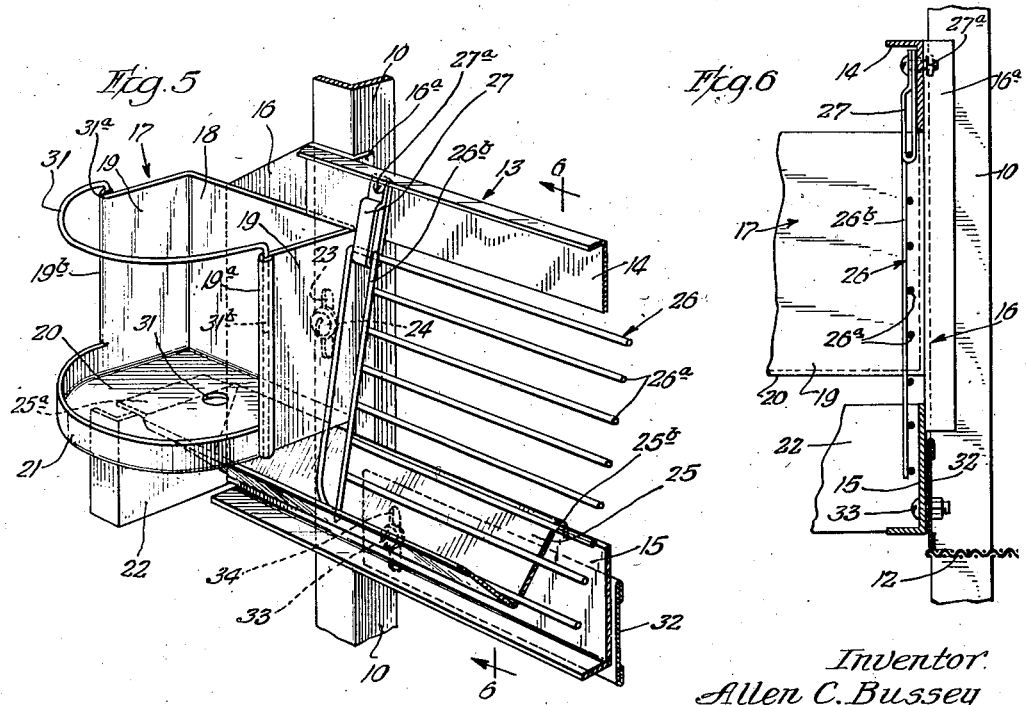
Inventor:
Allen C. Bussey

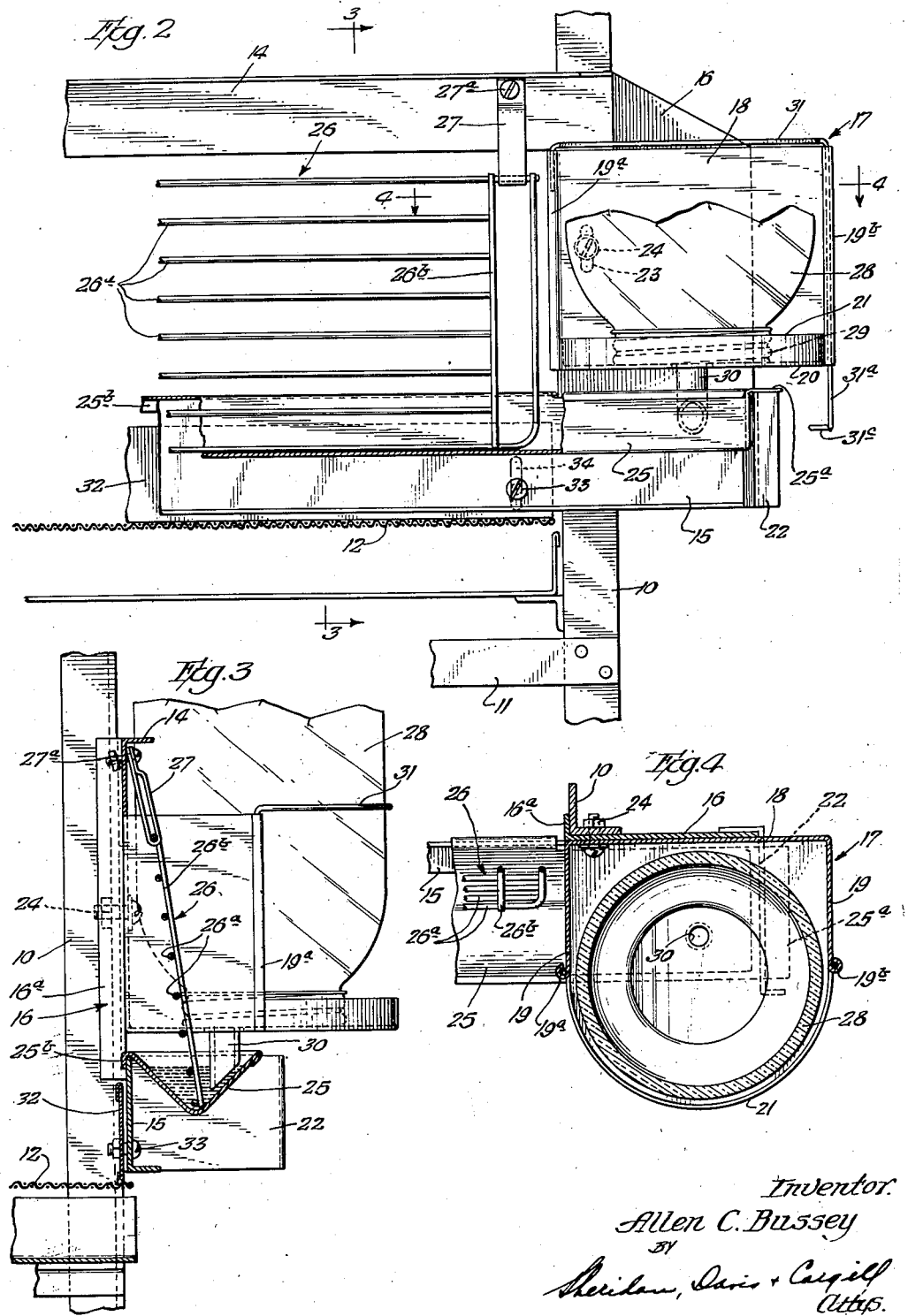

Patented Feb. 16, 1943

2,311,207

UNITED STATES PATENT OFFICE 2,311,207

PEN CONSTRUCTION

Allen C. Bussey, Chicago, Ill., assignor to Bussey Pen Products Company, Chicago, Ill., a corporation of Illinois Application April 7, 1941, Serial No. 387,150

5 Claims. (Cl. 119—17)

This invention relates to improvements in pen construction of the type which generally is arranged in stack or battery form by poultry raisers.

One object of the invention is to provide a drinking trough and water supply means which can be cleansed readily with little difficulty and without wasting relatively large quantities of water.

Another object of the invention is to provide a unitary side wall structure or closure member for a pen comprising a drinking trough and a grille which together with associated parts constitute a closure for a side wall of a pen and prevent access of chicks to the trough except for drinking purposes, thereby keeping the trough in relatively sanitary condition.

Another object of the invention is to provide a drinking trough structure including water supply means therefor which can be adjusted vertically as a unit from time to time for adapting the elevation of the trough to the needs of the chicks as they increase in size.

Another object of the invention is to provide water supply means for a pen comprising a removable trough and an invertible water-holding vessel or vessels for automatically supplying water to the trough for maintaining the water therein at a given level and which prevent the removal of the trough while the vessel or vessels are in water supplying position.

Other objects of the invention relate to various features of construction and arrangement of parts which will be apparent from a consideration of the following specification and accompanying drawings wherein:

Fig. 1 is a front elevation of a battery for a stack of pens embodying the present improvements;

Fig. 2 is an enlarged broken front elevation of a single pen embodying the present invention;

Fig. 3 is a vertical sectional view taken on line 3—3 of Fig. 2;

Fig. 4 is a sectional view taken on line 4—4 of Fig. 2;

Fig. 5 is a perspective view of an end portion of the improved closure member; and Fig. 6 is a sectional view taken on line 6—6 of Fig. 5 but showing a grille member in the position it assumes when the associated water trough is removed.

In Fig. 1 of the drawings, a battery or stack of three pens is shown for the purpose of illustration, the battery being provided with a suitable supporting frame comprising corner members 10, transverse members 11 and screen or wire mesh floors 12 for each pen. In said figure, one side only of the battery is shown, it being understood that the remaining sides of the pens may be of any suitable construction, such as of wire mesh, or they may be provided with feed troughs or the like as desired.

The sides of the pens shown in the drawings are closed by structures indicated generally by the numeral 13, each of which embodies the present improvements. Since the three closure members 13 illustrated are identical, only one will be described in detail. Each closure member 13 of the present invention constitutes one side wall of the pen and comprises a frame formed of upper and lower horizontal angle members 14 and 15 which are secured together as by welding the same at the ends to plates 16. The plates 16 are provided with inwardly directed guide flanges 16a, the plates being so spaced apart horizontally that the flanges 16a contact the inner walls of the uprights or corner members 10 at opposite sides of the pen. Secured to the front face of each plate 16 is a water vessel supporting member indicated generally by the numeral 17, each of which comprises a sheet metal member 18 having side flanges 19 and a base 20, the forward portion of which is provided with an upright flange or rim 21. Also secured to the plate 16, as by spot-welding, is a forwardly extending horizontal bracket 22 spaced suitably at its upper end from the lower surface of the base 20. The members 16 and 18 are each provided with a vertical slot 23 through which a bolt 24 passes for securing the corresponding end of the closure member 13 to posts 10, whereby the closure member is adjustably supported in position at the proper height above the corresponding floor 12 of a pen.

A sheet metal trough 25 is provided which is V-shaped in cross-section and at its ends is provided with horizontally projecting flanges 25a which are adapted to rest upon and be supported by the brackets 22 as shown in Figs. 1, 2, 4 and 5. The trough also is provided at its inner upper edge with a downwardly turned flange 25b which, as shown in Fig. 5, is adapted to hook over or engage the upper edge of the horizontal frame member 15. The trough is thus supported not only at its ends by means of the flanges 25a resting upon the brackets 22 but is supported throughout its length by reason of the engagement of the flange 25b with the upper edge of the frame element 15.

To provide a closure for the space between the upper and lower frame members 14 and 15, a grille is provided which is indicated generally by the numeral 26 which, in the form illustrated, comprises horizontal wires 26a which are connected as by welding to transverse wires 26b. The grille 26 is swingably supported by means of loop-shaped clips 27 which are secured as by means of bolts 27a to the upper frame member 14. Normally the grille 26 is supported in an outwardly swung position as shown in Fig. 3, the lower end of the grille resting in the bottom of the V-shaped trough 25. This trough is of such width that the grille, while in the position mentioned, provides access of the chicks to water in the trough for drinking purposes but discourages them in attempts to get into the trough bodily. The members 17 are adapted to support water-holding vessels, such as glass jars 28, which may be conventional Mason jars, provided with screw caps 29 depending from which are water delivery tubes 30. The lower ends of the tubes are formed at an angle or truncated to correspond generally with the inclination of the adjacent side wall of the trough as shown in Fig. 3; and when the vessels 28 are in the position shown in the drawings, each tube 30 projects through an aperture 31 in the respective base 20, as shown in Fig. 3, and automatically supplies water to the trough and maintains the water in the trough at a given level. For the purpose of preventing accidental dislodgement of the vessels 28 from their supports, flanges 19 of the members 17 are shown as provided with tubular rolls 19a and 19b which carry an arcuate wire guard 31 having downwardly extending arms 31a and 31b, the latter being shorter than the former, whereby when the guard 31 is elevated to free arm 31b arm 31a will still be within the tubular member 19b and constitute a hinge whereby the guard 31 may be swung pivotally to permit removal of a vessel 28 from the supporting base 20.

The lower end of the arm 31a may be offset or bent at an angle, as shown at 31c in Fig. 2, to prevent the accidental withdrawal of the guard from the tubular member 19b.

As shown in Fig. 1, each closure member is provided with two vessels 28, each of which delivers water to a trough 25. The water supply tubes 30 of each vessel, as stated above, project into the respective trough and prevent removal of the trough while the vessels are in the inverted or water delivering position. By reason of this arrangement an attendant thus cannot inadvertently remove a trough for the purpose of cleaning the same, for example, and thereby permit the water in the vessels to escape.

In order to remove a trough, as hereinafter explained, the corresponding vessels 28 must be removed from the supports 20 and may be turned to upright position and replaced upon the supports 20 for convenience. When the vessels have been so moved to upright position, the corresponding trough 25 can be raised slightly to cause the flange 25b to disengage the upper edge of the frame 15 and then slid forwardly or away from the uprights 10, there being adequate space between the upper ends of the brackets 22 and the bottoms 20 of the members 17 to permit such upward movement of the troughs. When the trough has been so removed, the grille 26 will swing from the inclined position shown in Fig. 3 to the substantially vertical position shown in Fig. 6, and thus prevents the escape of chicks from the pen while the trough is being cleaned.

In replacing the trough, the grille is slid upwardly, such action being afforded by the loop-shaped clips 27, the end flanges 25a of the trough being slid over the brackets 22 and the trough then slightly elevated to cause the hook-shaped flange 25b to engage the upper edge of the frame member 15. The grille is then lowered and, due to the V-shape of the trough, it automatically is restored to the original position shown in Fig. 3. Due to the shape of the trough also, the grille cannot be swung outwardly by chicks pressing against the same as would be the case were the trough provided with a flat bottom. The V-shaped trough thus not only retains the grille in proper position but it causes the grille to be restored to that position automatically when the grille is lowered into the trough as above-described.

The closure member 13, including the trough 25, the water holding vessels 28, and their supporting shelves 20 may be adjusted vertically as a unit along the frame members 10 by reason of the slots 23 above referred to. This is desirable since, as chicks increase in size, elevating the trough tends to discourage their attempts to enter the trough bodily and keeps the water in the trough in a more sanitary condition. When the closure member is elevated to such a level that the lower portion of the frame member 15 is above the level of the floor 12 as shown in Fig. 3, a guard 32 may be utilized for closing such space and thus prevent chicks from getting their heads in said space in attempting to pass through the opening. The guard 32 preferably is formed of a strip of sheet metal and is adjustably secured to the frame member 15 by bolts 33 carried by the member 15 and projecting through slots 34 in the guard 32. Thus when the closure member 13 has been adjusted vertically sufficiently to form a substantial space between the floor 12 and the lower edge of the frame member 15, the guard 32 may be lowered with reference to the frame member 15 to close said space and can be secured in said adjusted position by means of the bolts 33.

By means of the present improvements, an adequate supply of water can always be maintained in troughs of the respective pens while the reserve supply of water in the vessels 28 is maintained in a sanitary condition. While the V-shaped troughs hold substantially less water than if they were provided with flat bottoms or were rectangular in shape, the supply of water is replenished automatically from the receptacles 28 to maintain an adequate supply at all times for the chicks in the pen. Hence, when it is necessary to clean the trough, there is less wastage of water than if the water holding capacity of the troughs were greater. Inasmuch as the troughs cannot be removed without first turning the receptacles 28 to an upright position or removing them from the supports 17, the attendants do not accidentally waste the water in the receptacles as might occur if the troughs could be removed from operative positions independently of the receptacles.

While I have shown and described certain embodiments of my improvements for the purpose of illustration, I do not wish to be restricted specifically thereto since various changes in the details of construction may be resorted to without departing from the spirit of the invention.

I claim:

1. In a pen construction of the class described, a frame for a side of the pen comprising upper and lower horizontal and vertical end members defining an opening, a grille hinged at the upper edge thereof to the frame and tending to hang pendent over the opening to close the same, and a V-shaped trough supported by said frame on the exterior thereof and along the lower portion of said opening for receiving between the lower portions of the converging walls thereof the lower edge of said grille for holding the same in outwardly swung position to provide access to the trough from the interior of the pen for drinking purposes.

2. In a pen construction, a frame for a side of the pen comprising upper and lower horizontal and vertical end members defining an opening, a grille hinged at the upper edge thereof to the frame and tending to hang pendent over the opening to close the same, and a V-shaped trough supported by said frame on the exterior thereof and along the lower edge of the opening at an elevation for receiving between the lower portions of the convergent walls thereof the lower edge of the grille to retain the grille in a definite outwardly swing position providing access to the trough from the interior of the pen.

3. In a pen structure provided with a side opening, a grille provided with means hingedly securing the upper edge of the grille to the structure at points above the opening and providing for vertical sliding movement of the grille with respect to the structure, and a V-shaped trough at the lower portion of the opening on the exterior of the structure and into which the bottom portion of the grille can be lowered for moving the grille to an outwardly swung position for providing access to the trough from the interior of the pen.

4. In a pen structure provided with a side opening, a grille over the opening provided with means hingedly securing the upper edge of the grille to the outer face of the structure at points above the opening for outward swinging and vertically sliding movement with respect to the opening, and a V-shaped trough located along the lower edge of the opening and into the lower portion of which the lower edge of the grille seats when swung to a given outward position and from which position movement of the grille is resisted by the converging walls of the trough.

5. A pen of the class described comprising a supporting structure provided with vertical corner members, a floor supported by said members, a closure for a side of the pen comprising a rectangular frame extending between a pair of corner members and located above the floor level, said frame being adjustably secured to the structure whereby the frame can be adjusted vertically with respect to the floor, a grille for the frame opening provided with means on the upper edge thereof attaching the same to the frame for pivotal and vertical sliding movement relative to the frame, forwardly projecting trough supports secured to the frame adjacent the lower portions thereof, a V-shaped trough removably supported thereby and into which the lower edge of said grille can be lowered for retention by a wall thereof in an outwardly swung position to provide access to the trough from the interior of the pen, a forwardly projecting apertured shelf secured to the frame above an end of the trough, and a water receptacle on the shelf having a feed tube projecting through the aperture of the shelf for supplying water to the trough and preventing removal of the trough from the respective support while the tube is in water feeding position.

ALLEN C. BUSSEY.